United States Patent [19]

Hutchison et al.

[11] Patent Number: 5,651,266
[45] Date of Patent: Jul. 29, 1997

[54] DRIER/ACCUMULATOR FOR REFRIGERANT SYSTEM AND METHOD OF MAKING SAME

[75] Inventors: Wayne K. Hutchison, St. Thomas; William N. Eybergen, Dutton; Kenneth R. Blackman, St. Thomas, all of Canada

[73] Assignee: Eaton Corporation, Cleveland, Ohio

[21] Appl. No.: 627,626

[22] Filed: Apr. 4, 1996

[51] Int. Cl.⁶ ................................... F25B 43/00
[52] U.S. Cl. .................. 62/474; 62/509; 62/503; 29/890.06
[58] Field of Search ............... 62/474, 503, 509, 62/512, 475; 29/890.06; 285/405

[56] References Cited

U.S. PATENT DOCUMENTS

| | | | |
|---|---|---|---|
| 4,276,756 | 7/1981 | Livesay | 62/503 |
| 4,911,739 | 3/1990 | Cullen et al. | 55/387 |
| 4,920,766 | 5/1990 | Yamamoto et al. | 62/474 |
| 5,048,309 | 9/1991 | Carlisle | 62/503 |
| 5,191,775 | 3/1993 | Shiina et al. | 62/503 |
| 5,289,697 | 3/1994 | Hutchison | 62/474 |
| 5,365,751 | 11/1994 | Mikesell et al. | 62/298 |
| 5,515,696 | 5/1996 | Hutchison | 62/509 |

*Primary Examiner*—William Doerrler
*Attorney, Agent, or Firm*—Roger A. Johnston

[57] ABSTRACT

An aluminum header has spaced inlet and outlet ports formed thereon to closely interfit inlet and outlet tubes. A U-shaped standpipe has one end swaged in the outlet port and the opposite end spaced adjacent the header surface to control flow into the standpipe. A permeable dessicant filled pouch is folded over the standpipe and a deep drawn aluminum canister is received over the pouch and standpipe and welded to the header. An inlet tube with a convolution is received in the inlet port and header material deformed over the convolution to retain the tube. A separate outlet tube with a convolution adjacent one end is inserted in the outlet port from the side opposite the standpipe and header material deformed over the convolution to retain the tube in the outlet port. A bleed hole for lubricant is formed in the standpipe and a filter cartridge received over the standpipe and located over the bleed hole.

24 Claims, 3 Drawing Sheets

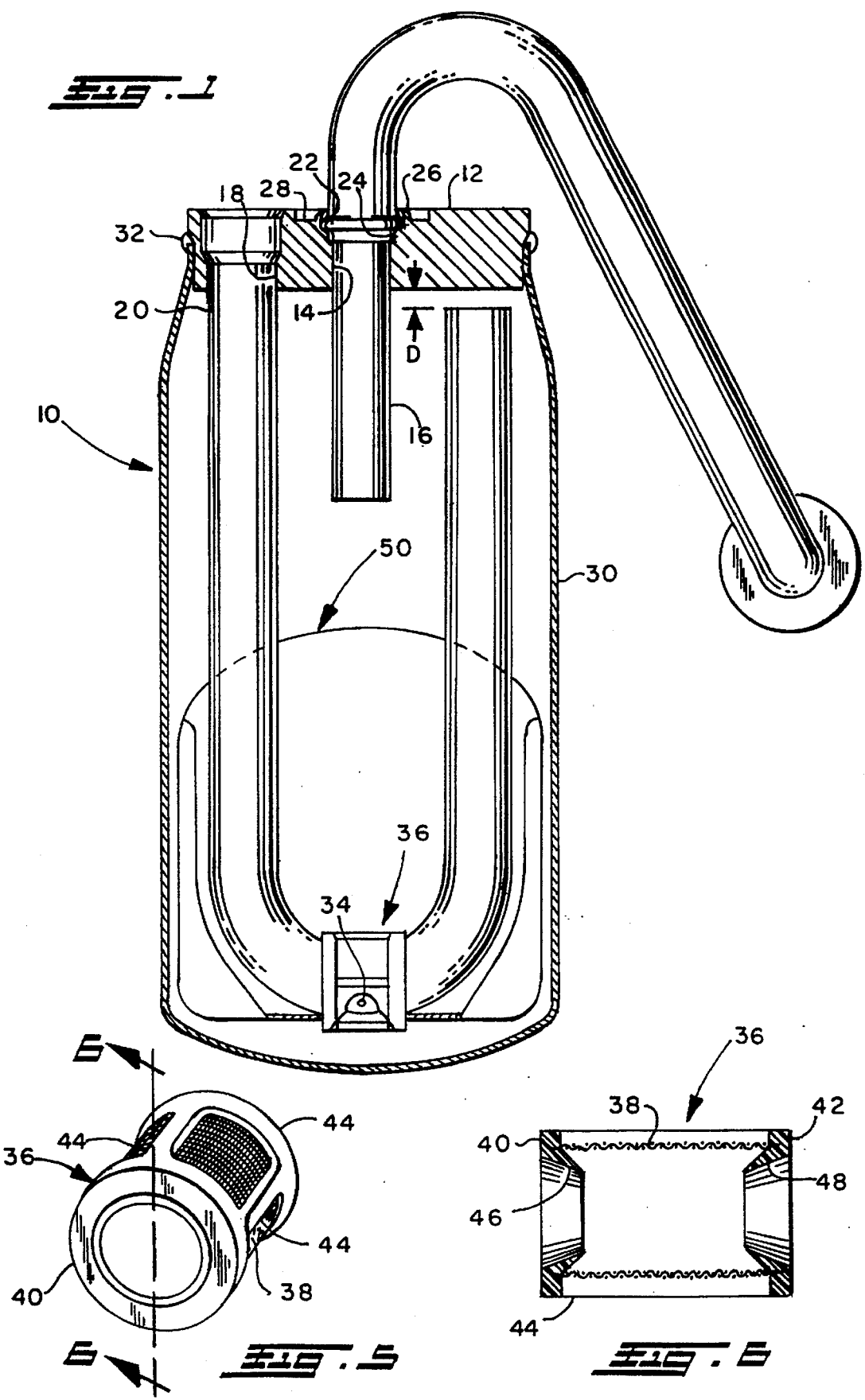

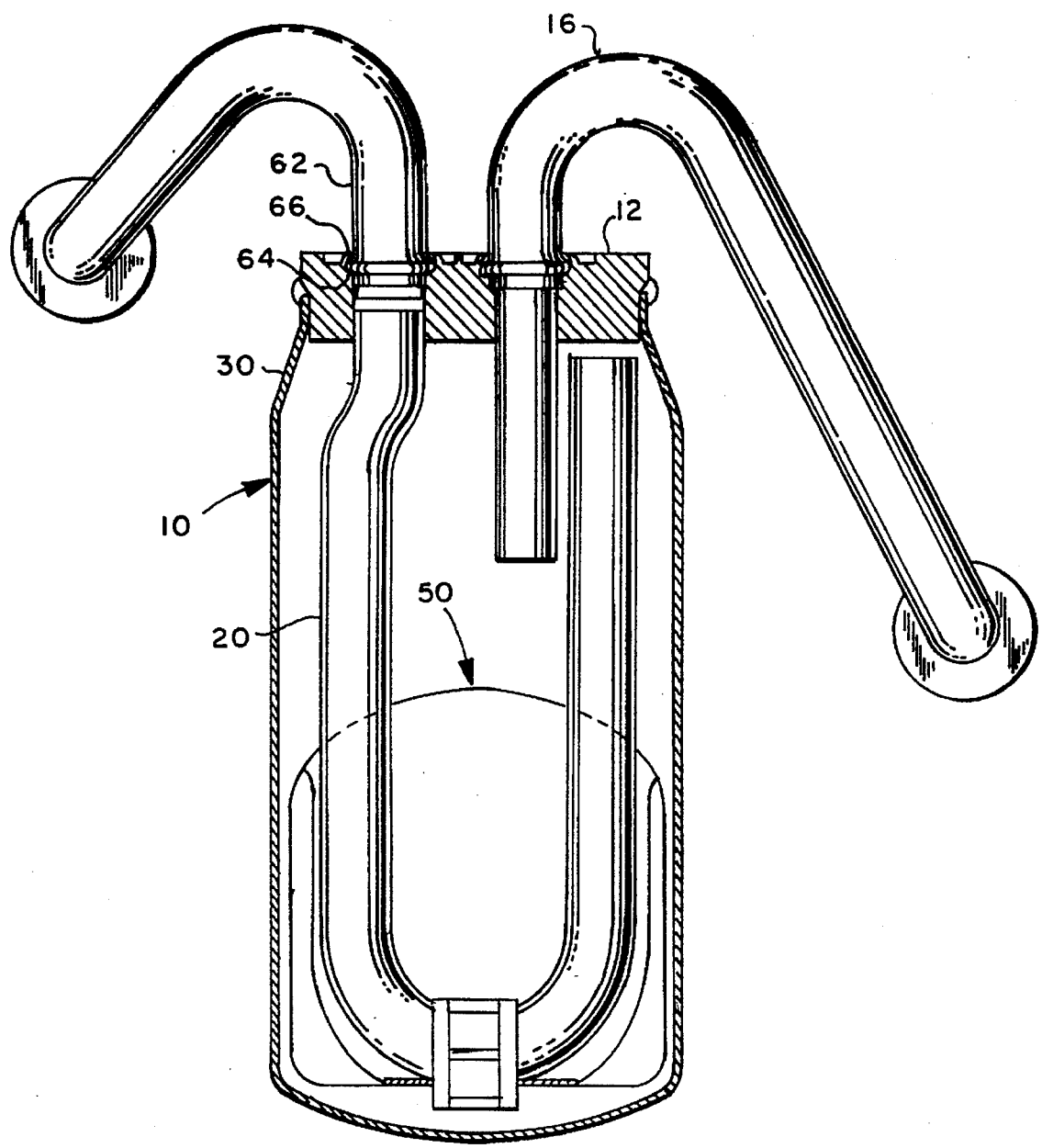

DRIER/ACCUMULATOR FOR REFRIGERANT SYSTEM AND METHOD OF MAKING SAME

BACKGROUND OF THE INVENTION

The present invention relates to low pressure side accumulators for refrigerant systems of the circulating type and particularly to drier/accumulators for such systems. In particular, the invention relates to such drier/accumulators utilized in automotive passenger compartment air conditioning systems where it is desired to accumulate and dry the saturated vapor refrigerant returning to the pump or compressor from the evaporator. Typically in an automotive air conditioning system the saturated vapor refrigerant returning to the compressor from the evaporator is at a pressure on the order of 20 PSIG (173 KPa).

In automotive air conditioning applications, it has been desired to reduce the cost of assembly of the system in mass production and to minimize the complexity of assembling the system conduits to the drier/accumulator during installation of the system into the vehicle on the assembly line. Heretofore, it has been the practice to weld attachment tubes to the header of the drier/accumulator with the ends of the tubes bent to facilitate attachment of external hoses thereto. However, the orientation of the ends of the bent tubes has proven to be difficult to predict for proper attachment of the hoses during installation into the vehicle. Therefore, it has been desired to provide a simple way of attaching the vehicle air conditioning system hoses to the drier/accumulator on the vehicle and to accommodate the need for varying the orientation of the bent tubes for attachment to the system connecting hoses.

It has thus been desired to provide a way or means of simplifying the construction, manufacturing cost and ease of installation of a drier/accumulator for a refrigerant system and particularly for an automotive air conditioning system.

SUMMARY OF THE INVENTION

It is an object of the present invention to provide a drier/accumulator for a refrigerant system and particularly an automotive air conditioning system which is easy to manufacture, easy to install in the refrigerant system and is low in manufacturing cost in mass production.

The drier/accumulator of the present invention employs an aluminum header with a U-shaped standpipe having one end swaged in the outlet port on the inside of the header; and, the opposite end of the U-shaped tube is disposed a predetermined space from the inside surface of the header for controlling flow into the standpipe. Desiccant in a pouch is disposed about the standpipe and a canister is assembled over the standpipe and pouch and welded to the header. An outlet tube is inserted in the outlet port from the outside of the header and is secured therein by deformation of the header material about the outlet tube. An inlet tube is similarly inserted into the inlet port from the outside of the header and is secured therein by deformation of the header material about the tube. In the preferred form the inlet and outlet tubes have convolutions formed thereon to facilitate retention by header metal deformation. If desired, a bleed or drip hole may be provided in the U-bend of the standpipe and an annular filter cartridge slipped over the standpipe for filtering residual lubricant flow through the bleed hole.

BRIEF DESCRIPTION OF THE DRAWINGS

FIG. 1 is a cross-section of the drier/accumulator of the present invention in its simplest form;

FIG. 5 is an isometric view of the filter cartridge of the embodiment of FIG. 1;

FIG. 6 is a section view taken along section indicating lines 6—6 of FIG. 5; and, FIG. 7 is a view similar to FIG. 1 with a separate inlet tube attached.

DETAILED DESCRIPTION

Figure 4:
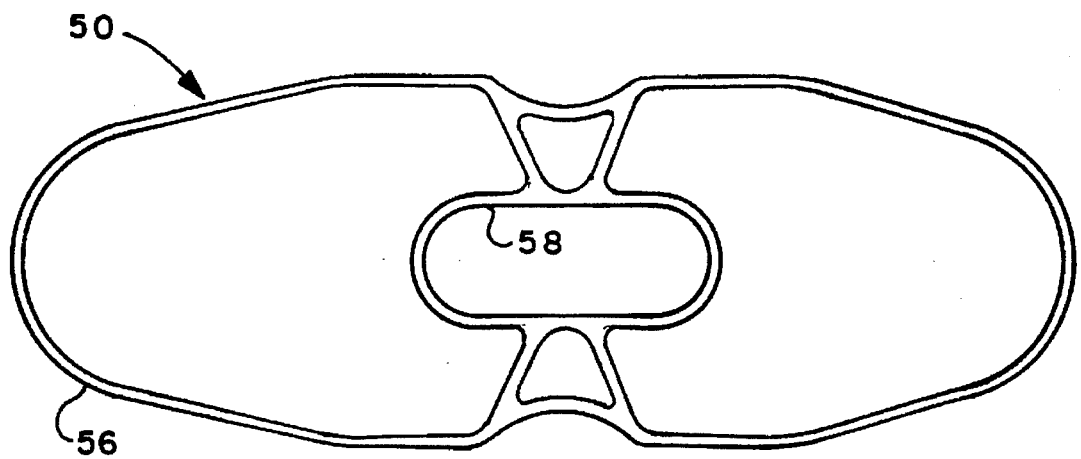
FIG. 4 is a top view of FIG. 3.
Figure 3:
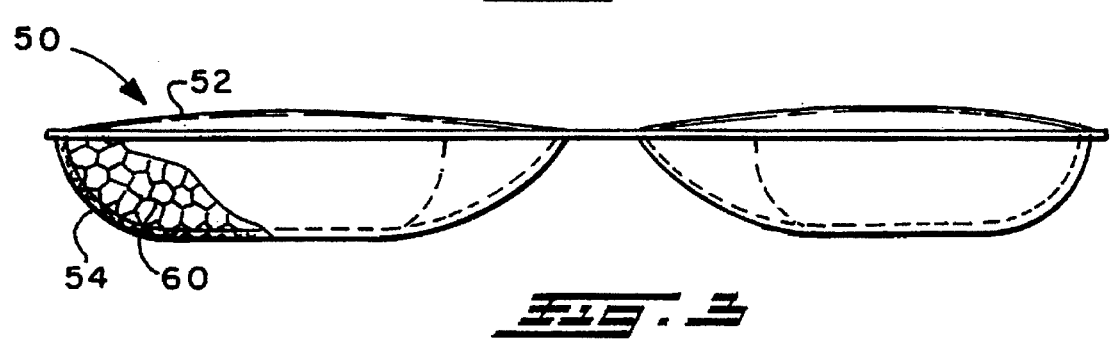
FIG. 3 is a side view of the desiccant pouch of FIG. 1.

Referring to FIG. 1, the drier/accumulator of the present invention is indicated generally at 10 and includes a header plate 12 having an inlet port 14 formed therein and in the presently preferred practice the port 14 is sized and configured to closely interfit in sliding engagement the outer diameter of an inlet tube 16 which is received therein. Header 12 has an outlet port 18 formed therein and spaced from the inlet port 14; and, outlet port 18 is similarly sized and configured to have one end of a generally U-shaped standpipe 20 received therein from the underside of the header 12. The end of standpipe 20 received in the port 18 is swaged outwardly by insertion of a tool (not shown) into the end of the standpipe through the port 18.

The opposite end of standpipe 20 is spaced adjacent the undersurface of header 12 by a predetermined distance indicated by reference character D. For a given size of standpipe 20, the distance D is chosen to restrict flow into the end of the standpipe to a desired rate of flow.

Inlet tube 16 has a convolution 22 formed thereon and has a seal ring 24 provided adjacent the convolution; and, the seal ring 24 is compressed in a counterbore provided in the port 14 for sealing between the tube 16 and the port 14. The inlet tube 16 is secured in the inlet port by deforming header material thereover as denoted by reference numeral 26, which is an annular fib formed by machining a groove 28 in the upper surface of the header about the port 14.

A deep drawn canister 30 is preferably formed of aluminum as are the header, standpipe 20 and inlet tube 16; and, canister 30 is received over the standpipe and has the rim thereof formed to closely interfit the outer periphery of the header and is welded and sealed thereabout as denoted by reference numeral 32.

Referring to FIGS. 1, 5 and 6, a bleed or drip hole 34 is formed in the U-bend of the standpipe and is sized to control flow of lubricant therethrough. A filter assembly indicated generally at 36 is formed of a cylindrical screen 38 insert molded into a surrounding plastic cage having annular end rings 40, 42 interconnected by ribs 44. The annular ends each have a seal lip formed annularly about the inner periphery as denoted by reference numerals 46, 48 which lip portions sealingly engage the periphery of standpipe 20 upon assembly of the filter 36 thereover and over the bleed hole 34 as denoted in FIG. 1.

Referring to FIGS. 1 through 4, a pouch indicated generally at 50 is formed by an upper and lower layer 52, 54 of permeable material such as polyester felt and the layers are sealed by weldment about the periphery thereof as denoted by reference numeral 56. The pouch 50 has an aperture 58 formed in the center thereof for receiving therein filter 36; and, the pouch 50 contains granular desiccant material 60.

Figure 2:
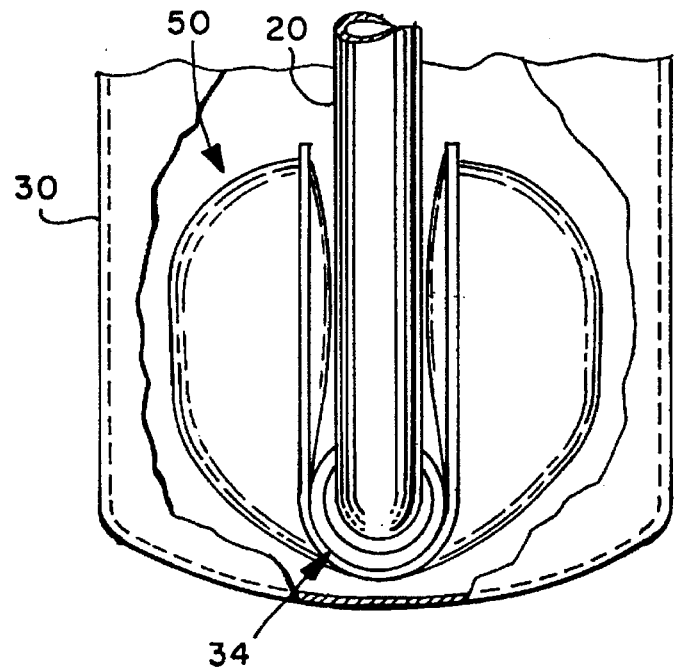
FIG. 2 is an enlarged side view of the lower portion of the embodiment of FIG. 1.

Referring to FIGS. 1 and 2, the pouch 50 is disposed within canister 30 and is preferably folded in saddle-like fashion over the filter 36 as shown in FIG. 2.

Referring to FIG. 7, the embodiment 10 of FIG. 1 is shown as having additionally attached thereto an external connecting outlet tube 62 received in outlet port 18 and sealed therein by a seal ring 64 and tube 62 secured therein by deformation of a metal rib 66 formed in the header about the port.

The present invention thus provides a unique and novel construction of a drier/accumulator for a refrigerant system, particularly suitable for automotive air conditioning systems, and which is light in weight, easy to assemble and low in manufacturing costs and has the external connecting tubes for the inlet and the outlet secured to the header without the need for separate attachment fittings.

Although the present invention has been described hereinabove with respect to the illustrated embodiments, it will be understood that the invention is capable of modification and variation and is limited only by the scope of the following claims.

We claim:

1. A method of making a drier/accumulator for a refrigerant system comprising:
   (a) forming a header having an inlet and outlet port and configuring said ports on one side of said header for receiving a tube therein in closely fitting sliding engagement;
   (b) forming a convolution on an inlet conduit and inserting said conduit in said inlet port on one side of said header and deforming the material of said header over said convolution and retaining said conduit;
   (c) attaching one end of a generally U-shaped standpipe to said outlet port on the side of said header opposite said one side and disposing another end of said standpipe a predetermined spacing adjacent the surface of said header for controlling flow into said standpipe;
   (d) disposing desiccant in a fluid permeable pouch and disposing said pouch about said standpipe; and,
   (e) disposing a canister over said standpipe and pouch and sealing said canister about said header.

2. The method defined in claim 1, further comprising forming an aperture in said standpipe and disposing an annular filter over said standpipe and filtering flow through the aperture.

3. The method defined in claim 2, further comprising inserting an outlet tube in said outlet port on said one side of said header and deforming the material of said header thereon and retaining said outlet tube thereon.

4. The method defined in claim 1, wherein said attaching said inlet conduit includes forming a convolution on said inlet conduit and deforming the material of said header over said convolution.

5. The method defined in claim 1, wherein said step of attaching said one end of said standpipe includes swaging.

6. The method defined in claim 1, wherein said step of attaching said canister includes welding.

7. The method defined in claim 1, wherein said steps of forming a header and disposing a canister include providing an aluminum header and providing an aluminum canister.

8. A drier/accumulator for a circulating refrigerant system comprising:
   (a) a header having an inlet and outlet port formed therein;
   (b) a generally U-shaped standpipe having an end thereof connected to said outlet port on one side of header and another end disposed adjacent the surface of said header for controlling flow into said standpipe;
   (c) an inlet conduit having an end attached to said header on the side opposite said one side and adapted for attachment to an evaporator discharge wherein said inlet conduit has a convolution thereon and said header has the material thereof deformed over said convolution;
   (d) a pouch formed of permeable material and having desiccant material disposed therein; and,
   (e) a canister received over said standpipe and pouch on said one side of said header and sealed thereon.

9. The drier/accumulator defined in claim 8, further comprising a bleed or drip aperture formed in said standpipe with an annular filter disposed over said standpipe and said aperture.

10. The drier/accumulator defined in claim 9, wherein said pouch is over said filter in saddle-like arrangement.

11. The drier/accumulator defined in claim 8, wherein said standpipe has said end thereof swaged into said outlet port.

12. The drier/accumulator defined in claim 8, wherein said inlet conduit has a convolution formed thereon and said header has the material thereof deformed over said convolution.

13. The drier/accumulator defined in claim 8, wherein said pouch is formed of fibrous material.

14. The drier/accumulator defined in claim 8, wherein said pouch is formed of fibrous plastic material.

15. The drier/accumulator defined in claim 8, further comprising a bleed or drip aperture formed in the curved portion of said standpipe with an annular filter disposed over said aperture.

16. The drier/accumulator defined in claim 15, wherein said filter is frictionally engaged on said standpipe.

17. The drier/accumulator defined in claim 8, further comprising a bleed or drip aperture formed in said standpipe; and, a filter screen disposed over said aperture.

18. The drier/accumulator defined in claim 17, wherein said filter screen has a generally cylindrical configuration.

19. The drier/accumulator defined in claim 8, wherein said pouch is formed of two sheets of fibrous material secured together about the margins thereof by weldment.

20. A drier/accumulator for a circulating refrigerant system comprising:
   (a) a header plate having an inlet port and an outlet port formed therein;
   (b) a generally U-shaped standpipe having an end thereof connected to said outlet port on one side of said header and another end disposed adjacent the surfaces of said plate to control flow with said standpipe;
   (c) an inlet pipe connected to said inlet port on said one side and extending from said header in a generally common direction with said standpipe wherein said inlet pipe has a convolution formed thereon with the material of said header deformed over said convolution for retaining said inlet pipe in said port;
   (d) a pouch formed of permeable material and having desiccant material disposed therein; and,
   (e) a canister covering said standpipe and pouch and sealed over said header on said one side, wherein inlet and outlet ports on the side of said header opposite said canister are each configured for receiving therein, in closely fitting engagement, one end of an external connecting tube.

21. The drier/accumulator defined in claim 20, further comprising an outlet tube received in said outlet port on the side of said header opposite said one side; and, said outlet tube is secured in said outlet port by deformation of the material of said header thereon.

22. A method of making a drier/accumulator for a circulating refrigerant system comprising:
(a) forming a header having an inlet and outlet port formed therein;
(b) forming a generally U-shaped standpipe and inserting an end in said outlet port and swaging said end into said outlet port and disposing another end at a predetermined spacing from the surface of said header for controlling flow into said standpipe;
(c) inserting an end of an inlet pipe in said inlet port and deforming the material of said header and securing said end into said inlet port;
(d) forming a cup-shaped canister and disposing a permeable desiccant pouch in said canister;
(e) assembling the open end of said canister over said standpipe and pouch and welding said canister to said header; and,
(f) inserting an outlet tube in said outlet port on the side of said header opposite said standpipe and deforming the material of said header and securing said outlet tube thereon.

23. The method defined in claim 22, wherein said step of securing said inlet pipe includes inserting a tool in said tube and expanding said one end.

24. The method defined in claim 22, wherein said step of disposing said dessicant pouch includes integrally forming a pair of said pouches and folding said pouches over said standpipe.

* * * * *